United States Patent Office 2,949,471
Patented Aug. 16, 1960

2,949,471
PREPARATION OF SUBSTITUTED THIONAPHTHENES

Vinzenz Prey, Vienna, Austria, assignor to American Cyanamid Company, New York, N.Y., a corporation of Maine No Drawing. Filed July 3, 1956, Ser. No. 595,580

6 Claims. (Cl. 260—330.5)

The present invention relates to a novel synthesis method and to new compounds produced thereby. More specifically, the invention is concerned with a novel preparation of a group of phenylmercaptothionaphthenes and to the products so prepared.

In particular, the invention deals with the production of a series of novel phenylmercaptothionaphthenes which may be represented by the general formula:

(I)
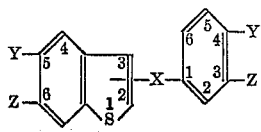

wherein:

(a) "X" represents (—S—) or (—CH$_2$S—);

(b) "Y" may be a member of the group consisting of hydrogen and the lower alkyl and alkoxy, halogeno, cyano, —CF$_3$, —CCl$_3$, —NO, —NO$_2$ and NH$_2$ radicals or —NHR, —NR$_2$ and —NHCOR radicals in which "R" is a lower alkyl radical, preferably methyl or ethyl; and (c) "Z" may be member of the group consisting of hydrogen or the halogeno, cyano, thiocyano, selenocyano, nitro and amino radicals or —NHR, —NR$_2$ and —NHCOR radicals in which "R" has the meaning given above.

From the foregoing description, it can be seen that the process of the present invention is of general applicability to the production of numerous and varied compounds.

In general, the process comprises bringing into reactive contact (a) about two molecular equivalents of a phenylmercaptan or metal salt thereof which may be represented by the general formula:

(II)
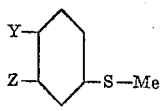

wherein "Me" is hydrogen or an alkali metal, preferably sodium, and "Y" and "Z" have the above-noted values; and (b) about one molecular equivalent of a suitable halogenated acetal or ketone such as a dichloroacetal (2,2-dichloro-1,1-dimethoxy or -1,1-diethoxy ethane) or dichloroacetone, dibromoacetone and the like. Reaction is carried out in a suitable solvent such as absolute alcohol, preferably under reflux.

Resulting reaction produces an intermediate either of the following general formula:

(III)
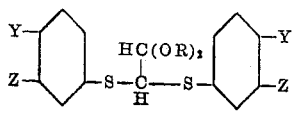

when halogenated aldehydes are used, and of the formula:

(IV)
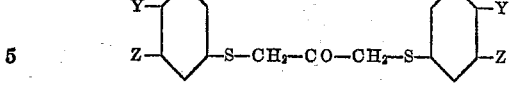

when the condensing agent is an halogenated acetone.

The resulting intermediate is then subjected to a ring-closure reaction according to known procedures using a suitable known agent such as a polyphosphoric acid. Intermediates of the Formula (III) type, after ring-closure, give mercaptoaryl-thionaphthenes with an (—S—) bridge, usually to the 2-position on the thiophene nucleus. Those of the Formula (IV) type usually produce a (—CH$_2$S—) bridge to the 3-position.

Thionaphthene, arylated in the 2- or 3-position has been prepared by ring-closure of a corresponding thiophenylketone. However, the ring-closure was considered possible only when a hydroxy or an alkoxy radical in the ortho-position was present in the thiophenyl residue. It is, therefore, quite surprising that compounds of the present invention, which do not have the radicals, or any other, in that position can be prepared. Nevertheless, according to the present invention it has been found that desired result can be obtained if after the ring-closure the aromatic residue is linked to the thionaphthene nucleus by an (—S—) or an (—CH$_2$S—) bridge, as in Formula (I) above. Intermediates for this step are shown in Formulae (III) and (IV). Provided this bridge limitation is complied with, the "Y" and "Z" substituents may be widely varied.

Condensation may be carried out in several ways. Use of an anhydrous solvent such as the above-noted absolute alcohol has certain advantages, particularly when using chloroacetals. It provides an alternative procedure for starting with a thiophenol and providing the alkali-metal as such in the solvent. It is not necessary to use anhydrous alcohol unless metallic sodium or potassium is used. Alcoholic or aqueous media containing sodium or potassium hydroxide may be used.

Moreover, if so desired, or necessary, still other media may be substituted. However, there should always be provision for sufficient (—OH$^-$) ions that the alkali metal ion may be able to combine with the halogen ions liberated from the halogenated aldehyde or ketone during the condensation.

Condensation should be preferably carried out at the boil under reflux conditions. Lower temperatures may be used but the reaction rate is correspondingly slower. Higher temperatures may also be used but they necessitate the use of pressurized equipment. In most cases, reaction will be quite exothermic. In these cases reflux equipment or other cooling means should be provided.

The intermediate products indicated above are new compounds. They are definite in structure, usually comprising oily liquids which may or may not solidify. They can be isolated as such if so desired. This procedure is illustrated by the following examples, in which, as in all the examples all parts are given by weight unless otherwise noted. These examples are intended as illustrative of the general synthesis method.

Example 1

About 25 parts (0.2 mols) of p-tolylmercaptan and about 19 parts (0.1 mol) of dichloroacetal is added to 70 parts by volume of absolute alcohol containing 4.6 parts (0.2 mols) of sodium and the mixture is held at the boil under reflux for about 70 minutes under a vented hood. After cooling, resultant sodium chloride is removed by filtration, the residual alcohol evaporated and the residue extracted with water. The aqueous extract is extracted with ether and the ether evaporated. The residue contains unreacted dichloroacetal which is distilled off at about 8–9 mm. pressure. The product 2,2-di(p-tolyl-mercapto)-1,1-acetalaldehydediethylacetal is an oily liquid soluble in water, alcohol and ether and having a refractive index $N_D^{20}$ of 1.544. Yield is about 23% of theory.

Example 2

Example 1 is repeated substituting about 18.7 parts (0.1 mol) of 2,2-dichloro-1,1-dimethoxy ethane for the dichloracetal. Product di(p-tolylmercapto)-1,1-acetaldehydedimethylacetal is obtained as an oily liquid.

Example 3

Example 1 is repeated using 0.2 mol parts of m-chlorophenyl mercaptan to replace the p-tolylmercaptan. Product di(m-chlorophenylmercapto)-1,1-acetaldehydediethylacetal is obtained.

Example 4

Substituting 0.2 mol parts of the following substituted phenylmercaptans in the procedure of Examples 2 and 3 gives mercaptophenylcarbonyl compounds having the general type Formula (III) above, in which the Y, Z and R substitutents have the values indicated in the following Table I.

TABLE I

| Mercaptan | Y | Z | R |
| --- | --- | --- | --- |
| p-chlorophenyl | Cl | H | $C_2H_5$ |
| 4-bromophenyl | Br | H | $C_2H_5$ |
| 3-nitrophenyl | H | $NO_2$ | $CH_3$ |
| 4-nitrophenyl | $NO_2$ | H | $C_2H_5$ |
| 3-amidophenyl | H | $NH_2$ | $C_2H_5$ |
| 4-methylamidophenyl | $CH_3NH$ | H | $CH_3$ |

As was noted above, not only may halogenated ketones be used if so desired to obtain Formula (IV) type intermediates. It was also noted that aqueous and alcoholic media containing caustic soda or potash may be employed. These procedures are illustrated in the following examples.

Example 5

A reactant mixture containing 24.8 parts (2 mols) of p-tolylmercaptan and 12.7 parts (1 mol) of 1,3-dichloroacetone in 40 parts by volume of ethanol is slowly added to 26.7 parts of 30% aqueous sodium hydroxide (2 mols) with constant stirring and cooling. Resultant product is drowned in dilute aqueous sodium hydroxide and an oil separates out and is recovered. Twelve parts (40% of theory) of α,α'-di(p-tolylmercapto) acetone melting at 67° C. is crystallized therefrom. The sulfur content is 20.9%—theory 21.2%.

Example 6

About 25 parts of 4 amidophenylmercaptan and about 13 parts of dibromoacetone is substituted for the p-tolylmercaptan and dichloroacetone of Example 5. Product α,α'-di(p-amidophenylmercapto) acetone is obtained.

As in the procedure of Examples 1 and 2 above, substitution of other phenylmercaptans of Formula (II) above give corresponding products under Formula (III). The same substitutions in the procedure of Examples 5 and 6 yield corresponding products under Formula (IV). Among such compounds so prepared are:

α,α'-di(m-chlorothiophenylmercapto) acetone
α,α'-di(p-chlorothiophenylmercapto) acetone
α,α'-di(p-bromothiophenylmercapto) acetone
α,α'-di(m-nitrothiophenylmercapto) acetone
α,α'-di(p-nitrothiophenylmercapto) acetone
α,α'-di(p-chloro-o-nitrothiophenylmercapto) acetone
α,α'-di(p-cyanothiophenylmercapto) acetone
α,α'-di(p-methoxythiophenylmercapto) acetone As was pointed out above, ring-closure of the intermediate, whether having an (—S—) or a (—CH₂S—) bridge can be carried out in the normal manner using a ring closing agent such as $P_2O_5$ or a polyphosphoric acid. This is shown in the following example.

Example 7

About eight parts of 2,2-di-(p-tolylmercapto)-1,1-acetaldehydediethyl acetal (from Example 1) is combined with about 50 parts of phosphoric acid and held at about 120° C. for about 50 minutes and cooled. Extraction with ether of resultant red reaction mixture and evaporation of the ether yields a brown oily liquid. Product 2-(4-tolyl mercapto)-5-methyl-thionaphthene (V)

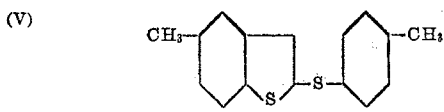

has an apparent molecular weight of 233 and a sulfur content of 13.3% which is in agreement with the theoretical 13.48% S and M.W.—238.

Example 8

About 10 parts of α,α'-di(p-tolylmercapto) acetone (obtained as in Example 4) was combined with 70 parts of polyphosphoric acid and heated at from about 170°–180° C. for about three hours and resultant mixture cooled. Resultant mixture is extracted with ether, the ether is evaporated and the residue is steam distilled. A colorless oil distills and solidifies on cooling. About 3 parts of product 3 - (p - tolylmercaptomethyl) - 5 - methylthionaphthene;

(VI)

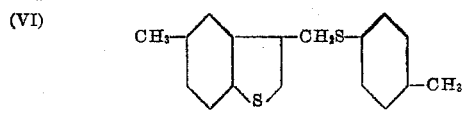

melting at 37°–38° C. is obtained.

Ring-closure may also be accomplished by other standard synthesis methods using standard agents such as sulfuric acid or zinc chloride. This is shown in the following example.

Example 9

About 10 parts of α,α'-di(p-tolylmercapto) acetone (obtained as in Example 4) was combined with 70 parts of sulfuric acid and heated at from about 170°–180° C. for about three hours and resultant mixture cooled. Resultant mixture is extracted with ether, the ether is evaporated and the residue is steam distilled. A colorless oil distills and solidifies on cooling. About 3 parts of product 3 - (p - tolylmercaptomethyl) - 5 - methylthionaphthene;

(VII)

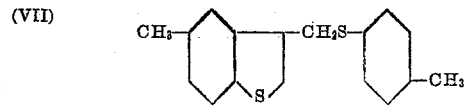

melting at 37°–38° C. is obtained.

The compounds of the present invention possess excellent insecticidal activity. This is illustrated in the following example in which compound A (produced in Example 7) and compound B (produced in Example 8 are compared with DDT and with hexachlorocyclohexane:

Example 10

About 0.4 gms. of the test substance is taken up in 10 ml. of acetone, distributed over an 11 cm. diameter filter paper in the bottom of a Petri dish, the acetone is evaporated and the dish closed. Drosophila melangoaster is used as the test animal. They are introduced directly into the dish for estimating contact (total) toxicity. In estimating respiratory toxicity, the test animals are kept from direct contact by an interposed layer of netting. Results are summarized in the following Table II. Effectiveness is estimated by the time required for 100% kill.

TABLE II

| Test Compound | Time in Minutes | |
|---|---|---|
| | Respiratory Toxicity | Contact Toxicity |
| Hexachlorocyclohexane | | ca. 60 |
| DDT | | 90-120 |
| Compound A | ca. 30 | 5-10 |
| Compound B | 20 | 5-10 |

I claim:
1. A phenylmercapto-thionaphthene of the formula

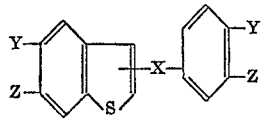

wherein (a) "X" is a bridging group selected from the group consisting of (—S—) and (—CH$_2$S—), the bond to the thionaphthene nucleus being to one of the 2- and 3-positions;

(b) "Y" is selected from the group consisting of hydrogen, lower alkyl, lower alkoxy, halogeno, cyano, nitro, amino and lower alkylamino;

(c) "Z" is selected from the group consisting of hydrogen, halogeno, nitro, amino and lower alkylamino radicals.

2. 2,2-di(p-tolylmercapto)-1,1-acetaldehyde dimethylacetal.
3. 2,2 - di(p - tolylmercapto) - 1,1 - acetaldehyde diethylacetal.
4. 3-(p-tolylmercaptomethyl)-5-methylthionaphthene.
5. 2-(p-tolylmercapto)-5-methylthionaphthene.
6. A method of producing a phenylmercaptothionaphthene of the formula

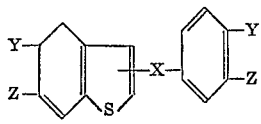

wherein (a) "X" is a bridging group selected from the group consisting of (—S—) and (—CH$_2$S—), the bond to the thionaphthene nucleus being to one of the 2- and 3-positions;

(b) "Y" is selected from the group consisting of hydrogen, lower alkyl, lower alkoxy, halogen, cyano, nitro, amino and lower alkylamino;

(c) "Z" is selected from the group consisting of hydrogen, halogen, nitro, amino and lower alkylamino; which comprises: mixing about two mol parts of a phenyl mercaptan of the formula

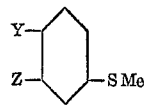

in which Me is an alkali metal and about 1 mol part of a condensing agent selected from the group consisting of dihalogenated dimethoxy and diethoxy ethanes and acetones; refluxing the mixture at the boiling point thereof until reaction substantially ceases, whereby a di-(phenylmercapto) compound is formed having the formula

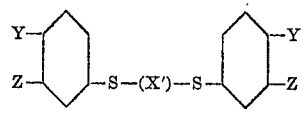

wherein (X') is selected from the group consisting of —CH$_2$—CO—CH$_2$— and

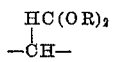

groups wherein R is selected from the group consisting of methyl and ethyl and refluxing said di-(phenylmercapto) compound at a temperature in a range of 120° C. to 180° C. to form a phenylmercaptothionaphthene.

References Cited in the file of this patent
UNITED STATES PATENTS
2,677,708    Copenhaver    May 4, 1954
FOREIGN PATENTS
864,559    Germany    Jan. 26, 1953